REVERTING CALL TELEPHONE SYSTEM

Filed Aug. 13, 1953 3 Sheets-Sheet 1

INVENTOR.
PIER BAKKER
BY
ATTY.

REVERTING CALL TELEPHONE SYSTEM

Filed Aug. 13, 1953 3 Sheets-Sheet 2

INVENTOR.
PIER BAKKER
BY [signature]
ATTY.

July 21, 1959 P. BAKKER 2,896,023

REVERTING CALL TELEPHONE SYSTEM

Filed Aug. 13, 1953 3 Sheets-Sheet 3

INVENTOR.
PIER BAKKER

BY Mc Walter Owen.

ATTY.

United States Patent Office 2,896,023

Patented July 21, 1959

2,896,023

REVERTING CALL TELEPHONE SYSTEM

Pier Bakker, Chicago, Ill., assignor to General Telephone Laboratories, Incorporated, a corporation of Delaware Application August 13, 1953, Serial No. 374,037

10 Claims. (Cl. 179—17)

The present invention relates to automatic telephone systems and more particularly to improved apparatus for setting up reverting call connections between substations associated with the same multi-party subscriber lines and also relates to special circuits used in conjunction with said reverting system for monitoring said multi-party substations from supervisory substations having access thereto.

In existing automatic telephone exchanges, wherein reverting call switches are utilized for ringing purposes in preparing reverting call connections, it is the usual practice, after dialling a particular number composed of several digits, to hang up the telephone to allow the reverting call circuit to function and signal the called party situated on the same line. A certain amount of delay and uncertainty occurs in establishing a reverting call using the present reverting systems. Moreover, it requires that certain components of the telephone system such as finders and selectors be used in establishing a reverting call between the multi-party-line substation subscribers. Up to the present time, no means were available by which all of the multi-party line substations could be monitored from several central locations whenever it became evident that no reply would be made from the particular called substation and it was of prime importance to answer all calls.

It is the object of the present invention, therefore, to provide improved circuits for setting up reverting call connections between the substations associated with the multi-party line of an automatic telephone system without the requirement of hanging up by the caller.

Another object of the invention is to provide an adapter circuit for setting up reverting call connections between the substations on a multi-party line without the use of a connecting switchtrain.

A further object is to provide special circuits so that monitoring stations may have access independent of the private automatic exchange system, to the multi-party line substations during emergencies.

Another object is to provide a circuit arrangement which will allow a regular call to be made from some of the multi-party line substations to the outgoing switchtrain entirely free of the inter-connecting adapter circuit.

The invention, both as to its organization and method of operation, together with further objects and advantages thereof, will be best understood by reference to the specification taken in connection with the accompanying drawings comprising Figures 1, 2, 3 and 4 which portray the invention characterized by the afore-mentioned features.

Figures 1 and 2 when assembled side by side illustrate the adapter circuit which contains therein various relays and the minor switch 188.

Figure 1:
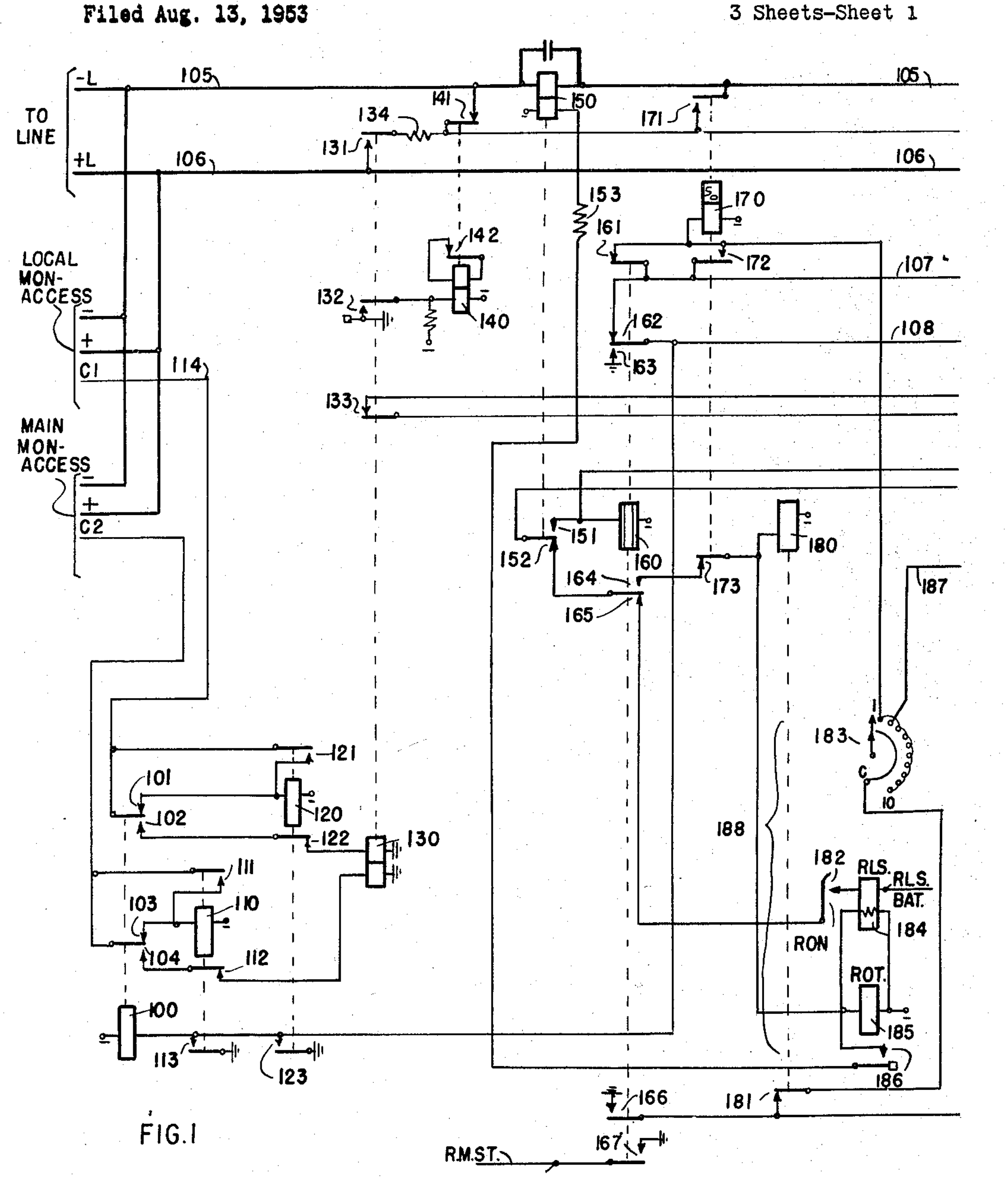

The telephone system employing such special circuits which will be later described in detail, was devised for an automatic processing plant requiring constant operation and supervision during continuous processing. I have shown in Fig. 4 a layout of the control room of one such type of plant for which this system was designed. The processing operator 320 and the local supervisor 340 are located in a control room having its walls filled with instrument panels housing the various instruments and meters indicating the conditions and degrees of the processes occurring at various stages throughout the entire processing plant. The control room is also equipped with various controls which in cooperation with the readings reflected on the instrument panels are used to regulate the processes transpiring within the plant. Telephone panels are located directly below the instrument panels. The telephone panels serve as terminations for a plurality of multi-party lines existing in the control room as will be later described.

The processing operator 320 and the local supervisor 340 are located on the first floor of the control room. The station of the local supervisor is permanently located in the center of the control room, with an unobstructed view of all panels. Assuming that there are four departments in the processing plants and that each department has allotted to it a specific wall section in the control room, it will be seen that each department will be able to transmit processing data to its assigned instrument panel. Telephone communication may be had between each department and the process operator 320 in the control room via a telephone panel situated beneath the instrument panel.

On the second level and on each wall of the control room, a catwalk exists which enables a control operator such as 310, assigned to the panel of one wall thereof to control certain processes in a particular department by manipulating the controls associated therewith. Similarly, another catwalk exists on the third level on each side of the room. Other operators, such as 300, situated thereat, have access to the controls on said level and their function is to control the remaining processes of the particular department in question. The work of the control operators, such as 310 and 300 is supervised by the process operator 320 via telephones connected to a multi-party telephone line.

The telephone system in this embodiment may comprise four multi-party lines, each associated with one side of the control room and each assigned to a pair of control operators situated on that one side, such as 300 and 310. Operator 320 has access to all of the instrument and the telephone panels.

When a call comes in from any department of the processing plant over a private automatic exchange system, it will signal the process operator on the telephone panel associated with that calling department. Operator 320 will then walk over to the telephone panel and by means of a jack connected telephone answer the call. During the course of ordinary events, most of the calls are made to the operator 320 whose function is to answer queries as to the data indicated on the instrument panels. Calls may be also made from any department to its control operators, such as 300 and 310, who are commonly connected by means of the multi-party line. Operator 320, by means of a reverting call (well known in the telephone art), may communicate with the control operators, such as 300 and 310, to give them operating instructions to affect the processing in such manner as will be reflected in the desired readings on the instrument panel. Should a necessity arise, control operators, such as 300 and 310, may also communicate between themselves by making a reverting call over the multi-party line in a manner well known in the telephone art. If any difficulty is experienced in the controls by any of the control operators, such as 300 or 310, a reverting call may be made over the multi-party line to inform the process operator 320 thereof. The circuits employed in establishing the last-mentioned reverting call are novel and are later fully described in this embodiment of the invention.

The function of the local supervisor 340 is to help out with the calls intended for the process operator 320. If the operator 320 is busy with a call on one multi-party line, the local supervisor may pick up the other incoming calls on the other multi-party lines on his own telephone. The telephone circuits, namely the local supervisor monitor access circuits, which enable the local supervisor 340 to pick up these calls are later described.

The main supervisor 350 is located in another room which is inter-connected with the control room by means of a telephone system. Special operating instructions may be given by the main supervisor 350 to the process operator concerning processing in a particular department of the plant via the P.A.X system. Should a busy condition exist on the P.A.X system, the main supervisor may by means of a monitor circuit (later fully described) establish an immediate contact with said process operator by use of Executive Right of Way (ERW) telephone circuit.

One of the multi-party lines and its associated substations 300, 310 and 320 inter-connect by means of the adapter circuit (Figs. 1 and 2) to the Private Automatic Exchange (P.A.X) switchtrain as shown partly by the finder-selector link 333 and 335 and the connector 334. Calls can be made from any of the multi-party line substations to any substation accessible over the connectors, such as 334, and to any of the supervisor stations 340 or 350.

Figure 2:
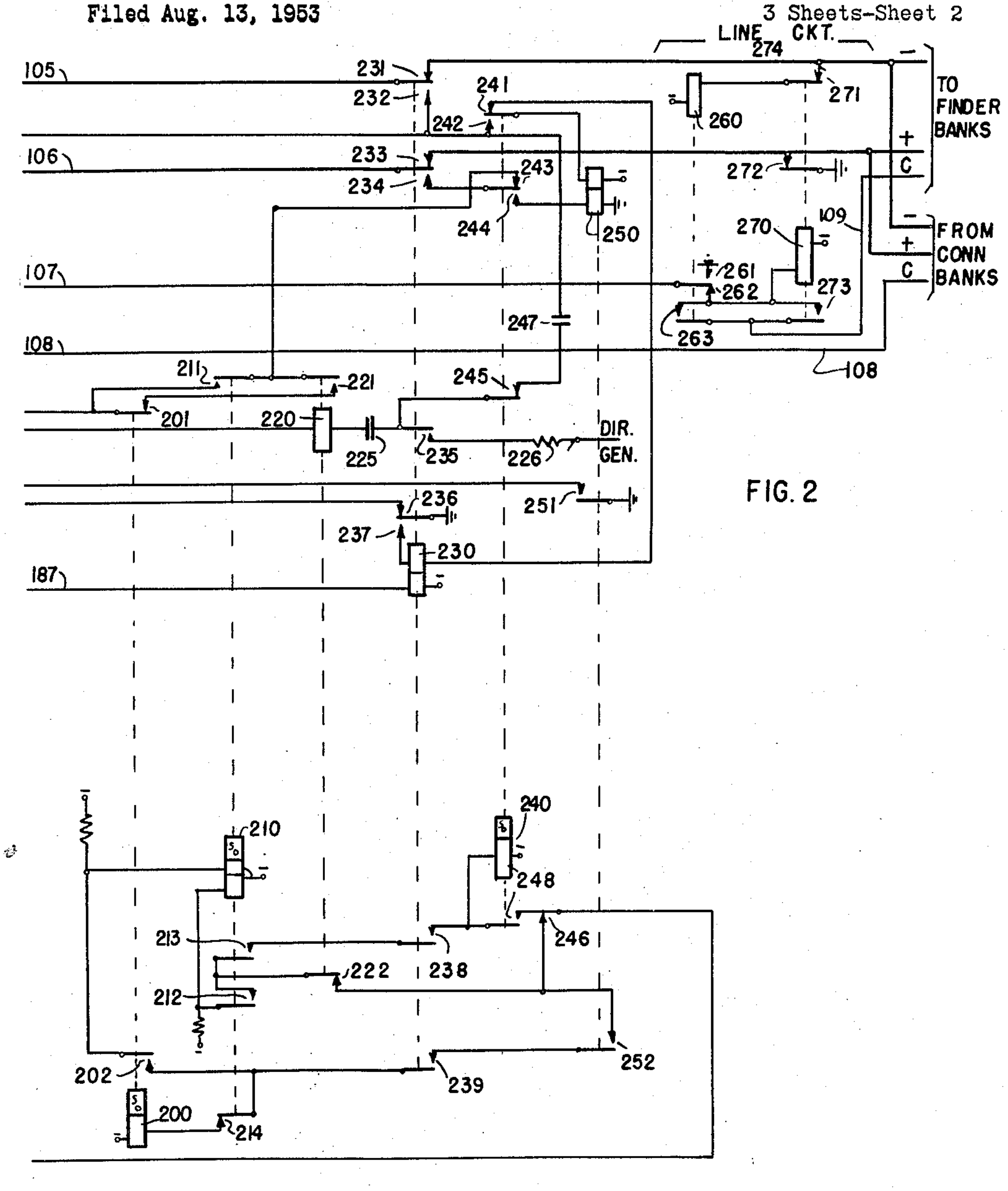

The supervisor stations 340 and 350, besides having access to the multi-party line substations, such as 300, 310 and 320, over the regular P.A.X switchtrain, have Executive Right of Way (ERW) facilities whereby a call may be made during an emergency from any of the supervisor stations to any of the multi-party line substations or a call intended for any of the multi-party line substations may be monitored by anyone of the supervisor stations. Reverting calls may be made by substation 320 to station 300 or 310 by dialing the selector 335 to the level of the conventional reverting call switches (not shown). Reverting calls may be made from stations 300 or 310 to station 320 by using the adapter circuit as shown in Figs. 1 and 2 without using any additional switchtrain beyond the line circuit 274.

OPERATION

*Calls to a multi-party line through the regular P.A.X connection*

A call may be made to the special party line from the local supervisor station 340, the main supervisor station 350, or from any other station by using the regular switchtrain including connector 334 and operating it to seize the line circuit 274. When the adapter circuit is seized from the connector 334, a circuit is closed to the relays 170, 100 and 270 from the ground placed by the connector on the lead 108. Relay 270 operates when current flows from the battery through the winding on relay 270, through contacts 262, line 107, contacts 162, line 108, and to ground on the "C" conductor of the line 338 impressed at the connector 334. Contacts 271 remove the line relay 260 from the circuit. Contacts 272 remove ground from line 106 and contacts 273 connect battery to lead 109. Relay 170 operates over the circuit from battery, through the relay 170, contacts 161, contacts 162, and to the ground on line 108 as hereinbefore described. Contacts 171 shunt the relay 150 of the adapter circuit and permit a normal call over this circuit over the leads 105 and 106. Contacts 172 establish a lock circuit for the relay. Contacts 173 open an incomplete circuit to relay 180. Relay 100 operates over the circuit from the battery through the winding on the relay to the ground on line 108 established at the line 338. The function of the relay 100 is to prepare the Executive Right of Way access (Mon. Access) by closing contacts 102 and 104. The opening of the contacts 101 and 103 will prevent the operation of the relays 120 and 110, respectively, which at this time are not necessary to operate relay 100 since it is operated already. Thereafter the desired substation, such as 320, is signalled from the connector over lines 105 and 106 and a call is established when a handset is removed at station 320. Description of the details of such a connection will not be described as it is well known in the art.

*Calls from the multi-party line through P.A.X switchtrain*

*Seizure.*—A call may be made from any one of the stations 300, 310 or 320 over the adapter circuit through the connecting switchtrain to any one of the supervisor stations such as 340 and 350 or to any other substation accessible over the finder-selector link 333 and 335. Removing the handset at one of the multi-party line stations, such as 320, closes a loop circuit through the line relay 260 of line circuit 274 and the relay 150 of the adapter. The circuit for relay 260 extends from the battery through the winding on said relay, contacts 271, contacts 231, through the upper winding on relay 150, line 105, to the closed circuit (not shown) in the substation 320, over the line 106, contacts 233 and to ground at contacts 272. Contacts 261 close and apply a source of ground to line 107 and through contacts 162 to line 108 to busy the line circuit to the connector 334. Contacts 263 establish a connection from relay 270 over the line 109 to mark this line circuit in the bank of the finder 333. As a result of the operation of relay 150, contacts 151 close a circuit to relay 160 and contacts 152 open an incomplete circuit to the release magnet 184. Relay 160 operates and causes contacts 161 to open the newly established circuit (via contacts 261) to the slow to operate relay 170 to prevent said relay from operating. Contacts 162 disconnect line 108 from line 107 and contacts 163 close ground to the line 108 to keep the line marked busy and to place an operating ground on relay 100. Contacts 164 close and prepare circuits to relay 180 and the rotary magnet 185. Contacts 165 open an incomplete circuit to the release magnet 184. Contacts 166 prepare a circuit to the rotary switch common bank contact of bank 183. Contacts 167 close ground to the lead connecting to the ringing machine start (R.M. St.).

Relay 100 operates over the circuit from battery through its winding to ground at the contacts 163. Relay 100 prepares the Mon. Access circuits to both supervisor stations 340 and 350 through the contacts 102 and 104. Relay 170, a slow to operate relay, will not operate from ground established by contacts 261 on the lead 107 before relay 160 operates and opens the contacts 161.

After the bank position of the line initiating the call has been marked, the allotted finder, such as 333, will hunt in a manner well known in the telephone art until the calling line is located. Thereafter the finder 333 connects the associated selector, such as 335, to the calling line. When the selector is seized, dial tone is transmitted to the calling line and a new source of battery potential, at said selector, is applied to the upper winding on relay 150 in lieu of the battery potential removed when cut-off relay 270 operates and opens the contacts 271.

*Dialling.*—At this stage, relays 100, 150 and 160 of the adapter are operated. Pulse relay 150, in series with a similar relay of the switch connected to this line by the finder 333, follows the dial pulses of the first digit and operates the rotary magnet 185 to step the wiper to a contact in bank 183 corresponding to the dialed digit. On the first pulse, relay 180 operates over the circuit from the battery through the winding on relay 180, contacts 173, contacts 164, contacts 152, and contacts 236 to ground. Slow to release relay 180 remains operated during the pulsing even though contacts 152 open intermittently during the pulsing period thereby keeping open the circuit to the rotary switch common bank contact of the bank 183 at the contacts 181. Keeping open the aforementioned circuit prevents the operation of relay 170 during the rotary stepping of the minor switch 188. The slow to release characteristics of the relay 180 are due to the shunting effect of the winding of the rotary magnet 185 and the lower (non-inductive) winding of the release magnet 184.

The rotary off-normal springs 182 operate on the first pulse and prepare a circuit to the upper winding of the release magnet 184. During each step of the rotary switch 188, the interrupter springs 186 close a circuit to the lower winding on relay 150 to aid in the re-operation of relay 150 at the end of each pulse over the following circuit: battery, lower winding of relay 150, resistor 153, interrupter springs 186, contacts 173, contacts 164, contacts 152, and to ground at the contacts 236. A single winding on relay 150 was not sufficient to operate it satisfactorily and therefore a booster circuit including the interrupter springs 186, as described hereinbefore, is used to overcome any unreliable operation.

When relay 180 restores at the completion of the pulses corresponding to the dialed digit, a circuit is closed to relay 170 through the rotary switch common bank contact of the bank 183 from ground at contacts 166, contacts 181, through the common bank contact of the bank 183, and through the winding on relay 170 to battery. Relay 170 operates and by means of contacts 171 shunts the pulse relay 150 thereby effectively removing it from line 105 to allow subsequent digits to be dialed free of this attachment. Contacts 172 establish a lock circuit for said relay. Contacts 173 open the circuit to the relay 180 and the rotary magnet 185. Relay 150 releases with the result that contacts 151 open the circuit to relay 160. Relay 160 releases and through its contacts 165 establishes a circuit to the release magnet 184 from ground at 236, contacts 152, contacts 165, rotary off normal springs 182, and through the upper winding on the release magnet 184 to the release battery. Contacts 167 open the ground connection to the ringing machine. The rotary switch 188 restores and the wiper at the bank 183 is returned to its normal position. Succeeding digits are dialled directly to the finder-selector link 333 and 335 over the line 105 and 106 free of any interconnecting components found in the adapter circuit.

*Reverting call from station 320 to station 300 or 310*

Station 320 may call station 300 or 310 by dialling a predetermined reverting call number over the finder-selector link, 333 and 335, to the level with the conventional reverting call switches (not shown). The call is completed under normal reverting call procedure which is well known in the art.

*Reverting call from station 300 or 310 to station 320*

*Seizure.*—The seizure of the finder-selector link is the same as discussed under Calls From the Multi-Party Line Through P.A.X Switchtrain.

*Dialling.*—At this stage, relays 100, 150, 160 of the adapter are operated. The calling of the station 320 from the station 300 requires the dialling of only one digit. It is not necessary to wait for dial tone. Lead 187 is connected to the bank contact of the bank 183 corresponding to the emergency reverting call number. The rotary switch 188 operates in the same manner as described under Calls From the Multi-Party Line Through P.A.X Switchtrain. In this embodiment, it is necessary to dial the digit "2" to establish a reverting call between station 300 and station 320. When this digit is dialled, the wiper at the bank 183 prepares a circuit to relay 230 which becomes completed when relay 180 restores at the completion of the dialled digit. A circuit is established for relay 230 from battery through the lower winding of relay 230, lead 187, through the wiper at the bank 183, contacts 181, and to ground at the contacts 166.

*Ringing.*—At this stage, relays 100, 150, 160 and the rotary switch 188 are operated. Relay 230 operates and by its contacts 231 and 233 opens the loop to release the succeeding switches such as the finder-selector link 333 and 335. Contacts 232 close and shunt the relay 150 thereby releasing it. Contacts 234 prepare a circuit to the lower winding on relay 250. Contacts 235 close ring-back tone to the calling party over the line 105 from the Dir. Gen., resistor 226, contacts 235 and 245, and through the capacitor 247. Contacts 236 open the operating circuit to the slow to release relay 160 but said relay remains closed because of a newly established ground at contacts 251 as will be described later. Contacts 237 close a circuit to the relay 250 through the upper winding on relay 230. Contacts 238 prepare a circuit to relay 240. Contacts 239 prepare circuits to relay 200 and relay 210.

Relay 250 operates and through its contacts 251 establishes a new holding ground for relay 160 thereby continuing to keep it operated. Contacts 252 close a circuit to relay 200 and prepare a circuit to relay 210. Relay 200 operates over the circuit from the battery through its winding, contacts 214, contacts 239, contacts 252, contacts 246, and contacts 166 to ground. Contacts 201 open an incomplete circuit to the ringing relay 220. Contacts 202 complete a circuit to relay 210 in multiple with relay 200.

Slow to operate relay 210 operates over the circuit from battery through its upper winding, contacts 202, contacts 239, contacts 252, contacts 246, and contacts 166 to ground. As a result, contacts 211 close and establish a ringing circuit from ground at the called station 320, capacitor 322, the A.C. relay 321, line 106, contact 234, contacts 243, contacts 211, contacts 133, relay 220, capacitor 225, contacts 235, resistor 226, and to ground through the A.C. generator Dir. Gen. Contacts 212 prepare a circuit to the lower winding on relay 210. Contacts 213 complete a circuit to relay 240 which because of its slow-operate characteristics will not operate due to the opening of the contacts 222 immediately thereafter as hereinafter described. Contacts 214 open the circuit to relay 200.

As a result of the closure of contacts 211, ringing relay 220 will operate and through its contacts 221 will prepare an alternate path for the ringing current. Contacts 222 open the circuit to the slow to operate relay 240 (unoperated at this time).

Relay 200 releases (contacts 214 opened) and at contacts 201 completes the prepared alternate path for the ringing current so that at this time the circuit extends from ground at the called station 320, capacitor 322, the A.C. relay 321, over line 106, contacts 234, contacts 243, contacts 221, contacts 201, contacts 133, and through the winding of the ringing relay 220 to the Dir. Gen. as previously described to signal the subscriber at station 320. Contacts 202 open the circuit to the upper winding on relay 210.

Relay 210 releases and through its contacts 211 opens the original path established for the ringing current. Contacts 214 re-close the circuit to relay 200. Relay 200 re-operates and at contacts 201 opens the ringing circuit hereinbefore described. Contacts 202 re-close the circuit to relay 210. Relay 210 re-operates and this cycle continues. Relays 200 and 210 are slow to operate and slow to release, resulting thereby in about a one-half second cycle of interrupted ringing current. The ringing relay 220 follows the cycle thereby producing a rapid operating signal at the station 320.

*Answering.*—At this stage, relays 100, 160, 230, 250, 200 or 210 and the rotary switch 188 are operated. When the called party answers by plugging in its telephone at the station 320, the ringing circuit is opened to cut off the ringing. Relay 220 restores and at contacts 222 establishes a circuit to relay 240 (when relay 210 operates during the next interrupter cycle and closes its contacts 213).

Relay 240 operates over the circuit from battery to ground over the contacts 238, 213, 222, 246 and 166, and by means of its contacts 241 disconnects the circuit to the upper winding of relay 250. Contacts 242 and 244 close the circuit to relay 250 to connect it to the line 105 and 106 for transmission battery. Contacts 243 open the ringing current circuit. Contacts 245 open the ring-back tone circuit. Contacts 248 establish a lock circuit for relay 240, which at this time will be energized from battery through the winding on relay 240, contacts 248, and to ground at contacts 166. Relay 200, via contacts 201, opens the ringing circuit during each interrupter cycle; this prevents the relay 220 from being held operated by any high resistance ground faults on the line after station 320 has answered. Opening of the contacts 201 also prevents relay 220 from remaining operated should a break down occur through a neon tube, such as 311, over the following circuit: Dir. Gen., resistor 226, contacts 235, capacitor 225, relay 220, contacts 133, 201, 221, 243, 234, line 106, through the handset 313, line 105, 221, 243, line 106, through the handset 313, line 105, ringer 312, and through neon tube 311 to ground. This will eliminate any spurious signals at the station 310.

*Releasing.*—At this stage, relays 100, 160, 210, 230, 240, 250 and the rotary switch 188 are operated. When the last party hangs up, the loop is opened. Relay 250 restores and through its contacts 251 opens the circuit to relay 160. Relay 160 restores and through its contacts 166 opens the circuit to relay 230. Contacts 163 open and remove ground from line 108 thereby breaking the circuit to relay 100. Contacts 165 prepare a circuit to the release magnet 184.

As a result of the opening of contacts at 166 relays 210 and 240 are released. Relay 230 restores and through its contacts 236 closes a circuit to the release magnet as follows: ground through contacts 236, contacts 152, contacts 165, rotary off-normal springs 182, and through the upper winding on the release magnet 184 to the battery. The rotary switch 188 is then restored to normal.

*Monitoring the multi-party line with executive right of way telephone*

Figures 3, 4:
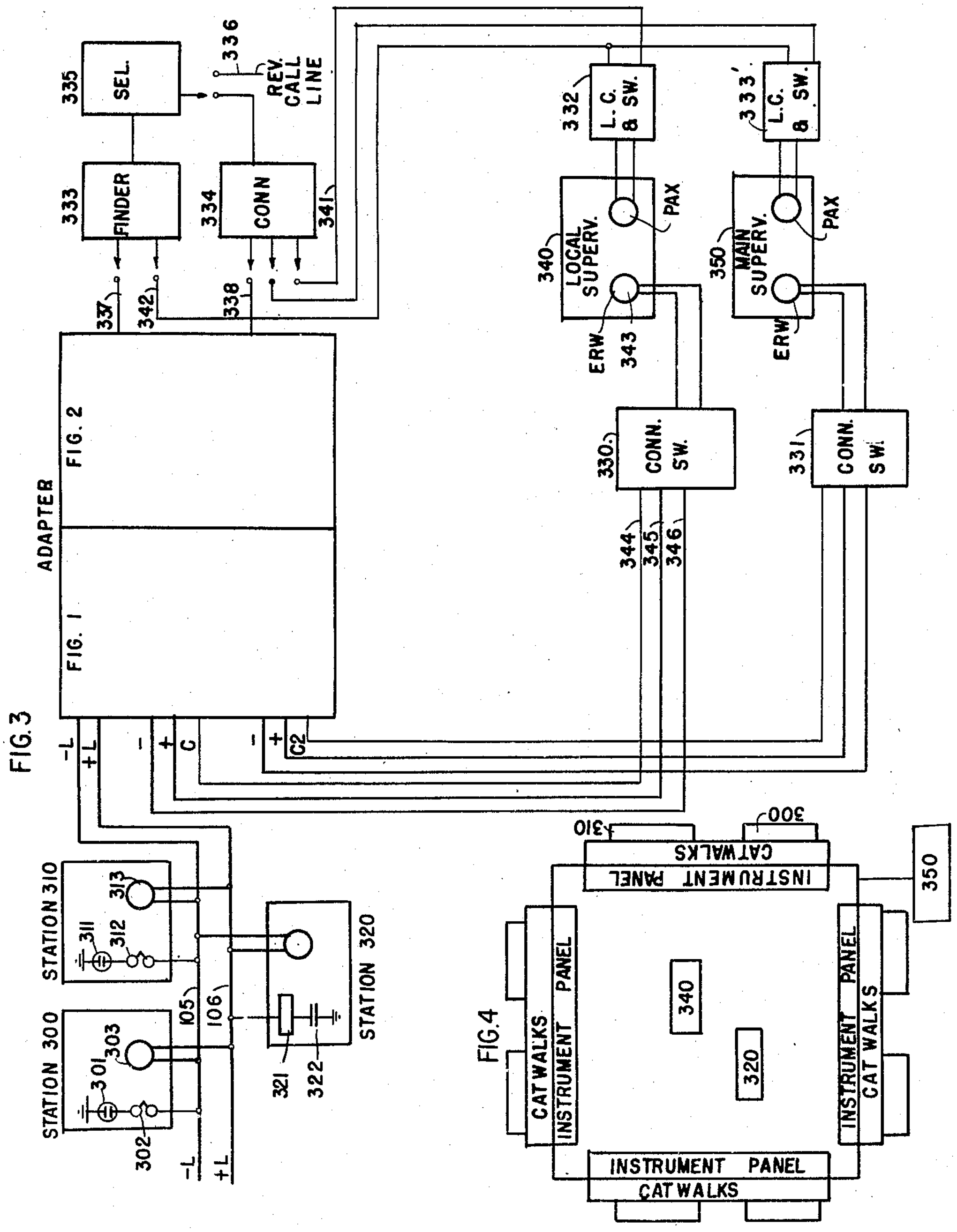
Figure 3 illustrates the components which are connected to the adapter circuit and also presents a visual layout as to how the adapter circuit functions in the telephone system as a whole.
Figure 4 is a top view of the control room housing the various substations described in this invention to present a physical relation therebetween.

A supervisor at any of the supervisor stations, such as station 340, can make a regular telephone call over the P.A.X handset at said station to any one of the multi-party line stations, such as station 300 situated on the third level catwalk, connected at line 105 and 106 over a circuit extending over the line circuit 332, line 342, finder 333, selector 335, connector 334 and over line 338, line circuit 274, and thereafter through the adapter circuit. Should the supervisor calling from the station 340 encounter a busy condition existing over the circuit hereinbefore traced, the supervisor may, in an emergency, obtain connection to said multi-party line by using the Executive Right of Way circuit including the ERW handset 343 (Fig. 3).

The method for establishing a call via ERW circuit from one of the supervisor stations, such as 340, to the multi-party line 105 and 106 during an idle period will now be described. A call is established by lifting the ERW handset 343 at station 340 and thereby seizing the circuit to the connector switch 330, and operating it to seize lines 344, 345 and 346 which terminate in the Local Mon. Access terminals of the party line (Fig. 1). Ground is closed by the connector switch 330 to the line 344, line 114, through the contacts 101, and through the winding on relay 120 to the battery operating relay 120. Contacts 121 establish a lock circuit for relay 120. Contacts 122 open an incomplete circuit to the upper winding on relay 130. Contacts 123 place a source of ground on lines 108 and 107 which causes the associated line cut-off relay 270 in the line circuit 274 to operate from ground at contacts 123, contacts 162, line 107, contacts 262, and through the winding on relay 270 to the battery. Contacts 123 also close a circuit to relay 100 causing it to operate. Operation of relay 270 causes the contacts 271 to open an incomplete circuit to the line relay 260. Contacts 272 remove ground from line 106 and contacts 273 connect ground to line 109. Relay 100 operates and through its contacts 104 prepares a circuit to the Main Mon. Access terminals should a call be made by the supervisor at station 350 during the present call. Contacts 101 open the initial operating circuit to relay 120. Contacts 103 open an incomplete circuit to relay 110.

Reverse normal ringing current from the ERW connector 330 is applied to line 105 to signal both of the stations 300 and 310 but not station 320. By prearranged plan, the operators at both of the called stations know in what order to answer. Assuming station 300 answers, the loop is closed to operate the ring cut-off relay (not shown) in the ERW connector 330 and transmission battery is closed to the called party line from the ERW connector 330. Thereafter a conversation may be had over the established talking circuit extending from the calling station 340 over connector 330, lines 345 and 346, 106 and 105 to the station 300.

A situation may arise where: (1) a call already exists between any one of the multi-party line stations and the P.A.X, or (2) a call is in the process of being established from P.A.X to the multi-party line, or (3) a call has been established or is in the process of being established from a supervisor station over the ERW system to the multi-party line. Anyone of these conditions will busy the adapter circuit.

Should the adapter circuit be busy (that is, relay 100 is operated and thus there is an absence of battery on lead 114 because contacts 101 are opened), because of an incoming call from the P.A.X to station 320, and the operator at said station has stepped out of the control room at this moment, the local supervisor at station 340 may pick the incoming call by means of its ERW telephone including the connector 330 which will extend battery over the line 344 to the lead 114 to operate the relay 130. Relay 130 operates over the circuit from battery (not shown) in the connector 330, line 344, lead 114, contacts 102 and 122, and through the winding on relay 130 to ground; and through its contacts 131 closes the resistor 134 across the lines 105 and 106 as a ring cut-off bridge. Contacts 132 begin to vibrate and finally close to establish a circuit to the relay 140. Contacts 133 open the reverting call ringing circuit. The bridging resistor 134, by being placed across the line 105 and 106, will operate the ring cut-off relay in the calling connector such as 334, associated with the calling station having access to the P.A.X system such as station 350. Opening the reverting call ringing circuit will permit intercepting a reverting call made either by station 300 or 310 to station 320 (if in progress) before station 320 can answer. Relay 140 becomes operated after a short delay and contacts 142 open the shorting circuit to the upper winding of said relay. The purpose of shorting the upper winding of relay 140 is to achieve the same results as is ordinarily obtained by using a copper slug at one end of a coil i.e. making it slow to operate. After the vibrations of the weighted spring 132 of relay 140 have diminished and have completed the circuit to relay 140, contacts 141 will open and remove the bridging resistor 134 bridged across the line 105 and 106. The ERW connector 330 switches through to immediately establish the transmission circuit.

If the main supervisor calls from station 350 via the ERW telephone, the adapter circuit is seized via the Main Mon. Access terminals by the connector switch 331.

Operation as to seizure and establishment of a transmission circuit is similar to that described for the call by the local supervisor via the ERW telephone to the station 300.

Two monitory points of access are provided so that any supervisor at any one of the supervisor stations may monitor a call existing on the multi-party line between any of the multi-party line substations and the P.A.X or between any one of said substations and other supervisor stations. Assume, as an example, that the local subscriber at station 340 has picked up a call intended for the operator (absent from the control room) at station 320 and that, at this moment, the main supervisor at station 350 desires to give processing orders to the operator 320. The main supervisor by means of its ERW telephone may call station 320. Lifting of the handset at station 350 will cause the connector 331 to be seized and establish a talking circuit in the manner previously described for an incoming call intended for 320 and picked up by the local supervisor. Thereafter conversation may be had between the two supervisors.

While there has been described what is at present considered to be the preferred embodiment of the invention it will be understood that various modifications may be made therein without departing from the invention and it is contemplated, therefore, in the appended claims to cover all such modifications as fall within the true spirit and scope of the invention.

What is claimed is:

1. In a telephone system, a multi-party line, an individual adapter circuit, a private automatic exchange, a single digit reverting call switch in said adapter controllable over said line, a plurality of substations having access to said line, means connecting said line to said private automatic exchange, impulse generating means at all of said substations, a plurality of relays in said adapter circuit, means operated responsive to the initiation of a call from any one of said substations for seizing said line and said adapter circuit, means in said adapter circuit operated in response to the receipt of impulses of direct current transmitted from said generating means corresponding to a single predetermined digit to control the operation of said reverting switch, a ringing means including said plurality of relays, a source of ringing current, said reverting switch when operated in response to the receipt of impulses corresponding to a predetermined digit completing a circuit to said ringing means, a pair of relays included in said ringing means, means including said pair of relays effective in response to actuation of said ringing means to operate alternately and intermittently to connect said source of ringing current to said other substations, disconnecting means controlled by said ringing means and said plurality of relays also effective in response to said actuation to disconnect said multi-party line from said private automatic exchange.

2. A telephone system as claimed in claim 1, including a plurality of monitoring stations having access to said line, circuit preparing means in said individual adapter circuit, said circuit preparing means effective in response to seizure initiated by any one of said substations and by an incoming call received over said private automatic exchange to prepare a connection between said monitoring stations and said line, and means controlled by any one of said monitoring stations in response to a call therefrom to connect directly to said line over said prepared circuit connection.

3. A telephone system as claimed in claim 1, including means in said individual adapter circuit operated in response to the impulses corresponding to certain digits for disconnecting said adapter circuit from said line and establishing a direct connection between a substation calling over said line to said private automatic exchange.

4. A telephone system as claimed in claim 2, including a bridging resistor, said preparing means effective in response to initiation of an intercepting call from any one of said monitoring stations to said line for connecting said bridging resistor across said line, said circuit preparing means effective in response to its actuation for subsequently disconnecting said bridging resistor from said line after establishing a connection between the calling monitoring station and said line.

5. In a telephone system, finder switches, connector switches, a party line having a plurality of substations thereon, a line circuit terminating said line and having multiple connections in the banks of said finder and connector switches whereby connections may be extended to and from the line, an adapter circuit individual to said line and connected in the line between the substations and the line circuit, signalling means and busy marking means in the adapter circuit operated responsive to one of said stations on a line making a reverting call to another substation of the same line for signalling said another station on said line and for applying a busy condition to the line by means of said multiple connections in the banks of said finders and connectors, other multiple connections for said line connected to the line between the adapter and the substations on the line, and means for extending connections to said line via said other multiple connections independent of the busy or idle condition of said line.

6. In a telephone system, a party line having a plurality of stations thereon, a line circuit terminating said line, finder-selector links and connector switches having access to said line circuit for extending connections to and from said line, reverting call equipment accessible to said line by way of said finder-selector links, means controlled over the line for operating one of said finders of a finder-selector link to seize the line and cause said selector of said finder-selector links to extend a connection thereover to said equipment, means in said equipment controlled over said line for controlling said equipment to signal certain of the stations on the line over said extended connection, a reverting call switch individual to said line and line circuit, a reverting call position in said switch, and means responsive to one station on the line making a reverting call to another station on said line for operating said switch to connect with said reverting call position, signalling means individual to said line and operated responsive to said switch connecting with said reverting call position for signalling said other station on said line independent of said line circuit and any extended connection therefrom.

7. In a telephone system, a multi-party line having a plurality of substations, signalling means and impulse generating means at said substations, an adapter circuit individual to and connected to said line, a reverting call switch in said individual adapter, means responsive to the initiation of a call by one of said substations removing the handset thereat for connecting said adapter circuit and said reverting call switch to the signalling and impulse generating means at the calling substation, means in said adapter circuit operated in response to the receipt of impulses transmitted over said line by the connected impulse generating means at said calling substation for operating said switch, a reverting call position in said switch, ringing means in said adapter circuit operated in case said switch is operated to connect with said reverting call position by transmitted impulses which correspond to a predetermined digit for operating certain of said connected signalling means over said line.

8. In a telephone system as claimed in claim 7, including a line circuit connected to said adapter circuit, a finder-selector link automatically connecting to said line circuit responsive to the initiation of a call by a calling substation, and means in said adapter circuit operated responsive to said switch connecting with said reverting call position on receipt of said impulses corresponding to said predetermined digit for disconnecting said finder-selector link from said line circuit and from said adapter circuit.

9. In a telephone system as claimed in claim 7, including a source of ringing current in said adapter circuit, and wherein said ringing means includes means for intermittently connecting said source to only one line conductor of said calling line whereby said ringing means is effective to operate one of said signalling means at another substation on said line while the handset at said one calling substation is still removed.

10. In a telephone system, a plurality of party lines each having a number of substations thereon, a line circuit individually connected to each line over which connections may be extended to and from the substations on the lines, an adapter circuit individual to each line, each said adapter circuit connected to its line between the substations and the line circuit, means for extending calls by way of said adapter circuits over said lines and line circuits, a switch in each adapter circuit having a reverting call position, means in the adapter circuit of a calling line operated responsive to one substation on said calling line making a reverting call to another substation on said calling line for operating its individual switch to connect with said reverting call position, signalling means in said adapter circuit operated responsive to the connection of said switch to said reverting call position for signalling said other substation on said calling line, and means in said adapter circuit for disconnecting said calling line from said line circuit in response to the connection of said switch to said reverting call position.

References Cited in the file of this patent

UNITED STATES PATENTS

| | | |
|---|---|---|
| 2,161,218 | Wright et al. | June 6, 1939 |
| 2,218,850 | Mahoney et al. | Oct. 22, 1940 |
| 2,278,548 | Kudrna et al. | Apr. 7, 1942 |
| 2,332,290 | Baumfalk | Oct. 19, 1943 |
| 2,541,362 | Jones | Feb. 13, 1951 |
| 2,571,250 | Jones | Oct. 16, 1951 |
| 2,659,769 | Elliott | Nov. 17, 1953 |